United States Patent [19]

Debesis

[11] Patent Number: 5,734,491
[45] Date of Patent: Mar. 31, 1998

[54] ELECTRO-OPTIC MODULATOR WITH THRESHOLD BIAS

[75] Inventor: John Richard Debesis, Penfield, N.Y.

[73] Assignee: Eastman Kodak Company, Rochester, N.Y.

[21] Appl. No.: 655,577

[22] Filed: May 30, 1996

[51] Int. Cl.$^6$ ........................................... G02F 1/07
[52] U.S. Cl. .................................. 359/254; 359/323
[58] Field of Search .............................. 359/254, 255, 359/323; 349/139, 140, 141, 142

[56] References Cited

U.S. PATENT DOCUMENTS

| 4,514,046 | 4/1985 | Carlsen et al. | 350/385 |
| 4,630,040 | 12/1986 | Haertling | 359/323 |
| 5,260,719 | 11/1993 | Maloney | 359/254 |

FOREIGN PATENT DOCUMENTS

1 558 851  1/1980  United Kingdom .

Primary Examiner—David C. Nelms
Assistant Examiner—Dawn-Marie Bey
Attorney, Agent, or Firm—Nelson Adrian Blish

[57] ABSTRACT

An electro-optic modulator (30) with a threshold bias. A PLZT substrate (14) has a plurality of first electrode pairs (12a) and (13a) on a first surface, and a plurality of second electrode pairs (12b) and (13b) on a second surface, which are aligned with the first plurality of electrode pairs. First and second electrode pairs are electrically isolated. A negative bias voltage is applied to the first plurality of electrode pairs (12a) and (13a). A positive bias voltage is applied to the second plurality of electrode pairs (12b) and (13b), which is approximately equal in magnitude to the first bias voltage. The bias voltage reduces the signal voltage necessary for optical transmission and improves the linearity of the electro-optic modulator (30).

20 Claims, 5 Drawing Sheets

ELECTRO-OPTIC MODULATOR WITH THRESHOLD BIAS

BACKGROUND OF THE INVENTION

1. Field of the Invention

The present invention relates to electro-optic modulators in general and in particular to an electro-optic modulator with a threshold bias.

2. Description of the Related Art

Electro-optic materials have properties which change according to the strength of an electric field established within the material. PLZT is an acronym for one such material, a transparent ceramic made from oxides of lead, lanthanum, zirconium, and titanium. When an electric field is induced in PLZT, it expands in one direction, contracts in another direction and changes optical transmission properties. Polarized light transmitted through the PLZT with an electric field established in the material is rotated about its axis by an amount proportional to the electric field applied. These properties make PLZT useful for light modulators and it is used in both ridge modulators and modulators with surface electrodes.

Figure 1:
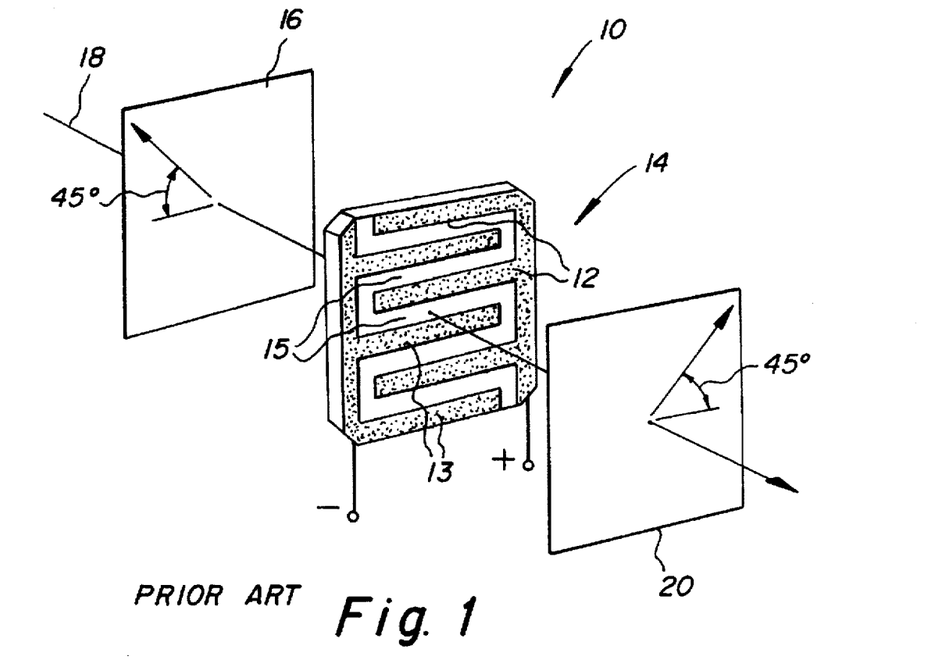
FIG. 1 shows a perspective view, partially in schematic, of a prior art electro-optic modulator.

An electro-optic modulator 10 with surface electrodes is shown in FIG. 1. First electrodes 12 and second electrodes 13 form a plurality of pairs mounted on a first surface of PLZT substrate 14. First electrodes 12 and second electrodes 13 have mirror image extensions on a second surface of PLZT substrate 14. Gaps 15, located between the electrodes 12 and 13, allow passage of light beams.

A first polarizer 16, oriented at a 45° angle to an axis parallel to first and second electrodes 12 and 13, polarizes a light beam 18. Without an electric field in electrodes 12 and 13, the light beam 18 is transmitted through the substrate 14 and is blocked by second polarizer 20, which has a polarization axis oriented at a right angle to the polarization axis of the first polarizer 16.

When voltage is applied to the first and second electrodes 12 and 13, the PLZT substrate rotates the polarization vector of the light beam passing through the material. As the voltage to electrodes 12 and 13 is increased, the intensity of the light beam transmitted through the second polarizer 20 increases, until the polarization vector of the light beam 18 transmitted through the PLZT substrate is identical to that of the second polarizer 20. Further increases in voltage causes the intensity of the light beam 18 transmitted through the second polarizer 20 to decrease, as the polarization vector of the light beam is rotated past 90°. The voltage at which the light intensity transmitted through the second polarizer reaches a maximum, is called the halfwave voltage. Electro-optic modulators with an electrode pattern, shown in FIG. 1, are used in film writers. For this type of electro-optical modulator, the halfwave voltage is between 200 to 280 volts, at a wavelength of 450 nm.

Figure 2:
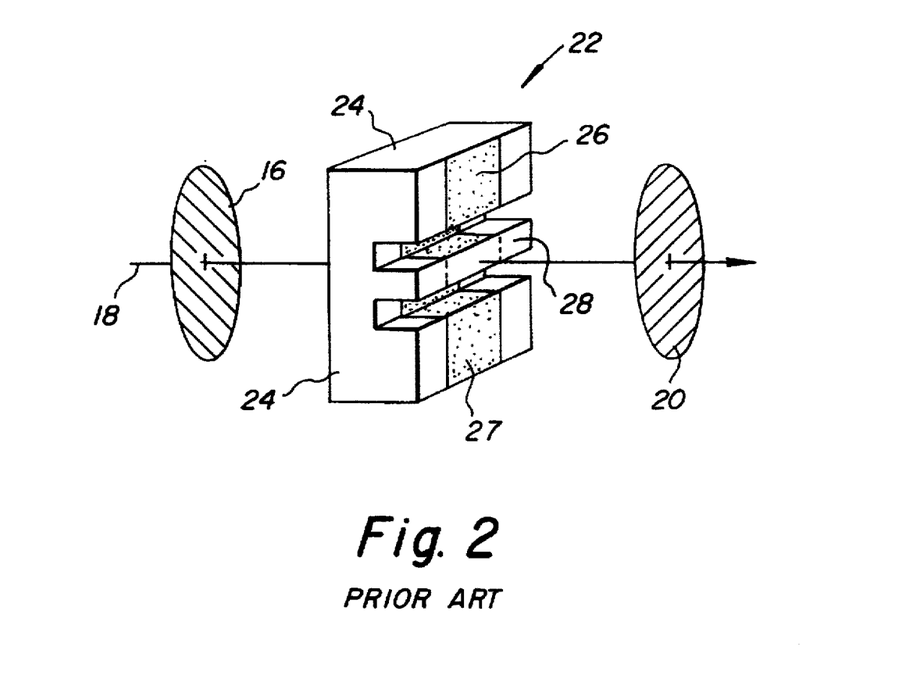
FIG. 2 shows a perspective view, partially in schematic, of a prior art ridge modulator.

Another type of electro-optic modulator, shown in FIG. 2, is the ridge modulator 22. Ridge modulator 22 is comprised of a first polarizer 16, PLZT substrate 24, and second polarizer 20. Electrodes 26 and 27 establish a field across ridge 28, which rotates the polarization vector of light beam 18 as described above.

Figure 3:
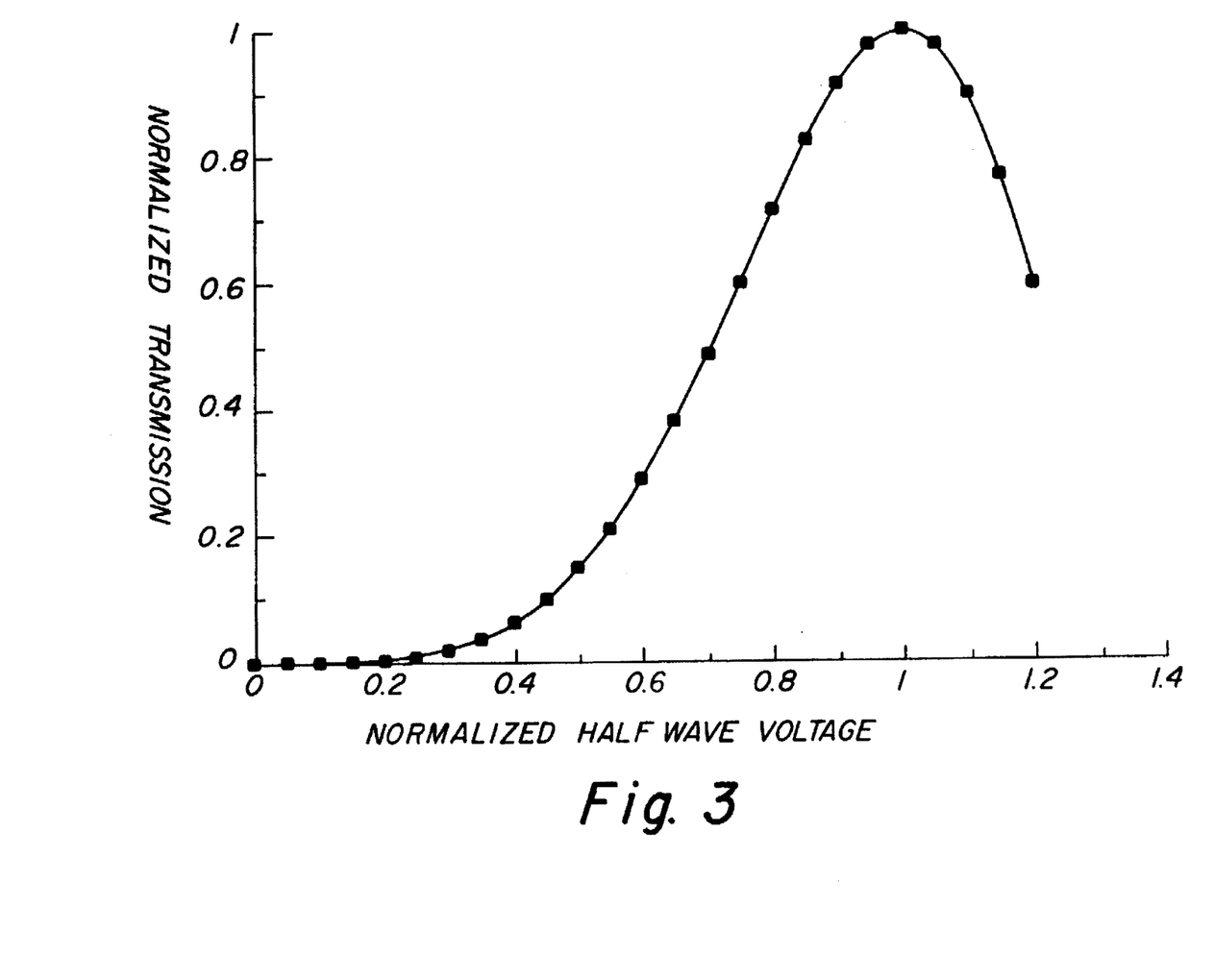
FIG. 3 is a normalized graph of voltage across electrode pairs of an electro-optic modulator, versus light transmitted.

The response of modulators is non-linear. For a single-channel ridge modulator, the light transmission through the modulator is a function of voltage, as shown by the curve in FIG. 3. The intensity of light transmitted through the second polarizer is proportional to the sine squared, of the applied voltage squared, according to the following formula:

$$T(V) = T_r + T_0 \sin^2(\pi n^3 RtV^2/2g^2\lambda)$$

where:

| | |
|---|---|
| $T(V)$ | = total light transmitted as a function of voltage; |
| $T_r$ | = minimum transmission at V = 0; |
| $T_0$ | = maximum transmission due to the electro-optic effect, including all losses due to absorption, reflections and scattering; |
| n | = index of refraction of PLZT; |
| R | = quadratic electro-optic coefficient of PLZT (3.8 × 10$^{-16}$ m$^2$/V$^2$ for PLZT); |
| t | = the effective optical path length, (3.0 × 10$^{-4}$ m); |
| g | = distance between the electrodes, (3.0 × 10$^{-4}$ m); |
| V | = applied voltage; and |
| $\lambda$ | = wavelength of the incident light in meters. |

The plot of this equation, shown in FIG. 3, has been normalized. At 30% of the halfwave voltage, only 2% light transmission occurs. This voltage is referred to as a threshold voltage. For an electro-optic modulator with a halfwave voltage of 120 volts, there is little light transmitted until the electrode voltage exceeds 40 volts. The reason for this is that the PLZT material is poled by the applied field. Poling is using an electric field to align the non-linear optical molecules to produce the electro-optic effect. A threshold voltage is necessary to pole the PLZT material and for any significant electro-optic effect to take place. The initial 40 volts provides sufficient poling to begin to rotate the polarization vector with further increases in the electric field. Thus, a significant portion of the signal voltage applied to an electro-optic modulator is expended in poling the material.

Another problem is that for a continuous tone printer, the modulator needs to produce pixel exposures with increments of 0.5% of the maximum exposure energy. The non-linearity of PLZT below the threshold voltage, makes it difficult to achieve a rapid response and difficult to do continuous-tone printing.

Some output writer systems also use an active feedback loop to control the transmission of light. This is accomplished by placing a photo detector value after the second polarizer, to adjust T(V) for a given exposure. For the standard modulator, the value of $T_r$, the minimum transmission, also sometimes called leakage, must be well below 0.025% of the maximum exposure energy. $T_r$ is affected by polarizer quality, alignment, and mechanical stress. However, $T_r$ may be higher than 0.025%, due to improperly aligned polarizers or stress birefringence in the modulator, or both. Also, this value will drift during operation due to the photo-refractive effect. Present feedback control loop cannot correct for these factors because $T_r$ is not a function of voltage.

SUMMARY OF THE INVENTION

The object of this invention is to improve the linearity of electro-optic modulators. This also achieves a more rapid response to input signals. It is also an object of the present invention to provide an electro-optic modulator that can be adjusted to eliminate leakage. The present invention is an electro-optic modulator in which electrode pairs on a first surface are electrically independent from electrode pairs on a second surface. A negative threshold voltage is applied to the electrode pairs on the first surface, and a positive threshold voltage is applied to electrode pairs on the second surface. The negative threshold voltage applied to electrode pairs on the first surface rotates the polarization vector of a light beam striking the surface in a first direction, and the positive threshold voltage applied to electrode pairs on the second surface rotates the polarization vector of the light beam in an opposite direction, effectively canceling out the rotation of the polarization vector caused by the negative threshold voltage applied to the first surface electrode pairs. The threshold voltage applied to the surface electrodes reduces the signal voltage necessary to change the electro-optic properties of the PLZT substrate, thus increasing the linearity and the response time of the electro-optic modulator. One of the two bias voltages can be adjusted to reduce light leakage.

In another embodiment, two electro-optic modulators are placed in tandem. Each of the individual modulators has electrode pairs on a first surface in series with electrode pairs on a second surface. A negative threshold voltage is applied to the first electro-optic modulator and a positive threshold voltage is applied to the second electro-optic modulator, so that the net rotational effect of the polarization vector of a light beam passing through both modulators is zero.

DETAILED DESCRIPTION OF THE PREFERRED EMBODIMENT

Figure 4:
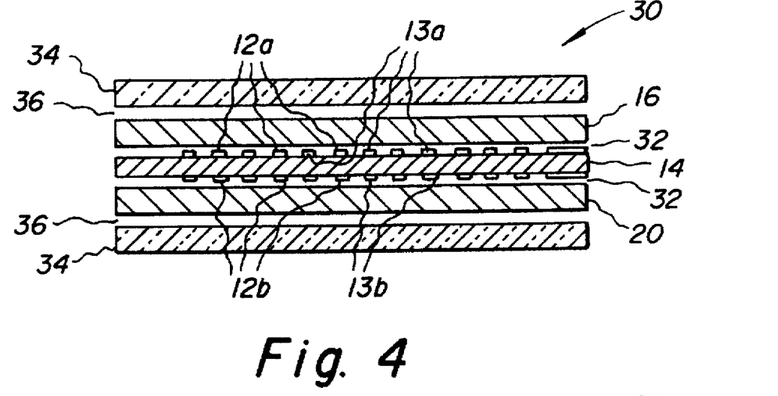
FIG. 4 shows a cross-sectional view of an electro-optic modulator assembly according to the present invention.

FIG. 4 shows an electro-optic modulator assembly 30 according to the present invention. The modulator assembly 30 is comprised of a PLZT substrate 14 with first electrode pairs 12a and 13a attached to a first surface of substrate 14, similar to the embodiment shown in FIG. 1. In this invention, however, second electrode pairs 12b and 13b, on a second surface of PLZT substrate 14, are electrically isolated from first electrode pairs 12a and 13a on the first surface. First electrode pairs 12a and 13a second electrode pairs 12b and 13b, are physically aligned, so that a light beam passing through gaps between the first electrode pairs 12a and 13a, will also pass between gaps between second electrode pairs 12b and 13b on the second surface.

The PLZT substrate 14 is bonded to a first polarizer 16 and a second polarizer 20 with an adhesive gel 32. The polarizers 16 and 20 are attached to 0.020" borosilicate glass plates 34 by pressure-sensitive adhesive 36. The polarizer-glass plates are attached with polarizer side toward the substrate. The glass plates 34 form the outer surfaces of electro-optic modulator assembly 30 and protect the film polarizer from being scratched during assembly or maintenance operations.

A negative bias voltage of approximately 30% of the halfwave voltage is applied across first electrode pairs 12a and 13a. A positive bias voltage of approximately 30% of the halfwave voltage is applied across second electrode pairs 12b and 13b. The negative bias voltage causes a rotation in the polarization vector of a light beam through a gap between first electrode pairs 12a and 13a. As the light beam passes through a gap between second electrode pairs 12b and 13b, the positive bias voltage rotates the polarization vector of the light beam in an opposite direction. Thus, the cumulative effect of the negative bias voltage and positive bias voltage on the rotation of the polarization vector of a light beam passing through PLZT substrate 14 will be zero. Any additional voltage applied to the electrode pairs, such as a signal voltage, will have an immediate effect on the amount of light transmitted, since the threshold voltage for the PLZT substrate has already been reached. This gives a faster response time for the electro-optic modulator and reduces the amount of signal energy required. The signal voltage could be applied to either the first electrode pairs 12a and 13a, or the second electrode pairs 12b and 13b.

Figure 5:
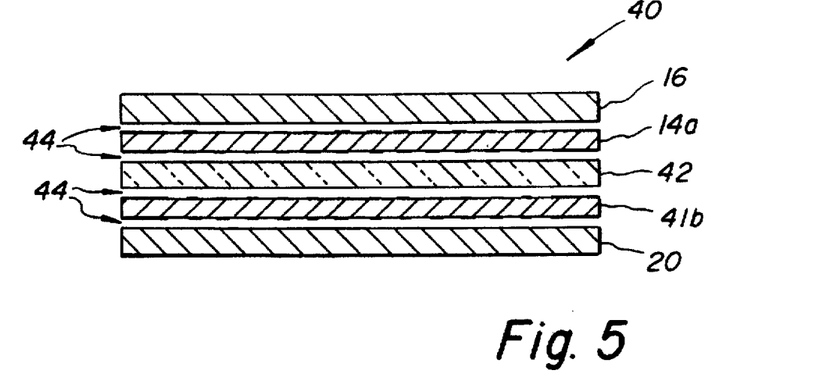
FIG. 5 shows a cross-sectional view of an alternate embodiment of an electro-optic modulator assembly according to the present invention.
Figure 6:
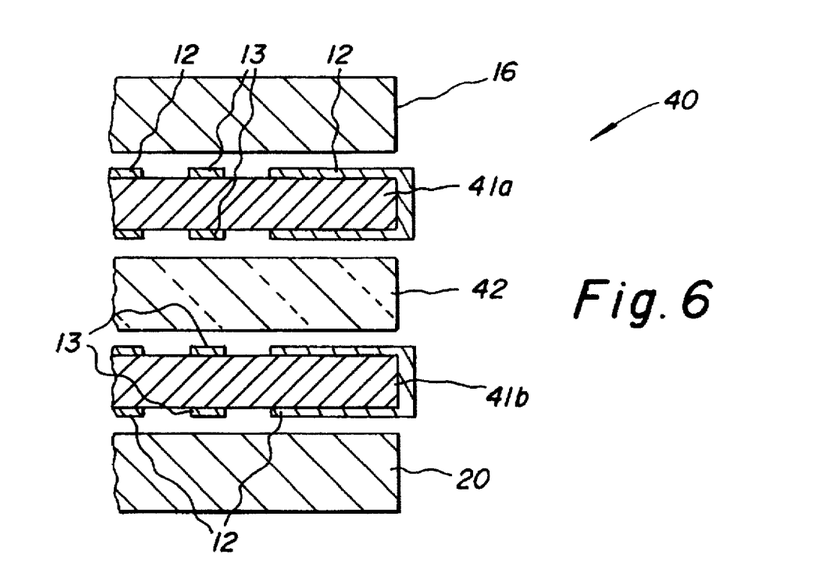
FIG. 6 shows an enlarged cross-sectional view of the electro-optic modulator assembly shown in FIG. 5.

FIGS. 5 and 6 show an alternate embodiment of the invention. A tandem modulator assembly 40 is manufactured by stacking two PLZT substrates 41a and 41b. First substrate 41a and second substrate 41b are each similar to the substrate shown in FIG. 1. Electrode pairs 12 and 13 are electrically connected to mirror image electrode pairs 12 and 13 on a second surface of the PLZT substrate. The electrodes on both surfaces of first substrate 41a are physically aligned. The construction of second substrate 41b is the same as first substrate 41a.

As shown in the expanded view in FIG. 6, first substrate 41a and second substrate 41b are aligned so that gaps between electrode pairs 12 and 13 on first substrate 41a are in line with gaps between electrode pairs 12 and 13 on second substrate 41b. This provides transparent areas equivalent to the transparent areas of the electro-optic modulator shown in FIG. 1. A glass plate 42, approximately the thickness of the PLZT substrate, ~0.015 inches thick, is placed between first and second substrates 41a and 41b as a spacer to insure electrical isolation of the electrodes on the first substrate 41a and the second substrate 41b.

The electrode pairs on the first PLZT substrate 41a are biased with negative voltage equal to 30% of the halfwave voltage and the electrode pairs on the second PLZT substrate 41 are biased with a positive voltage equal to 30% of the halfwave voltage. The first PLZT substrate 41 a rotates the polarization vector of a light beam passing through the first substrate in one direction, and the second PLZT substrate 41b rotates the polarization vector of the light beam passing through substrate 41a in the opposite direction an equivalent amount. Thus, the net rotation of the polarization vector through both substrates is zero and net light transmitted through the tandem modulator, absent a signal voltage, will be zero.

Figure 7:
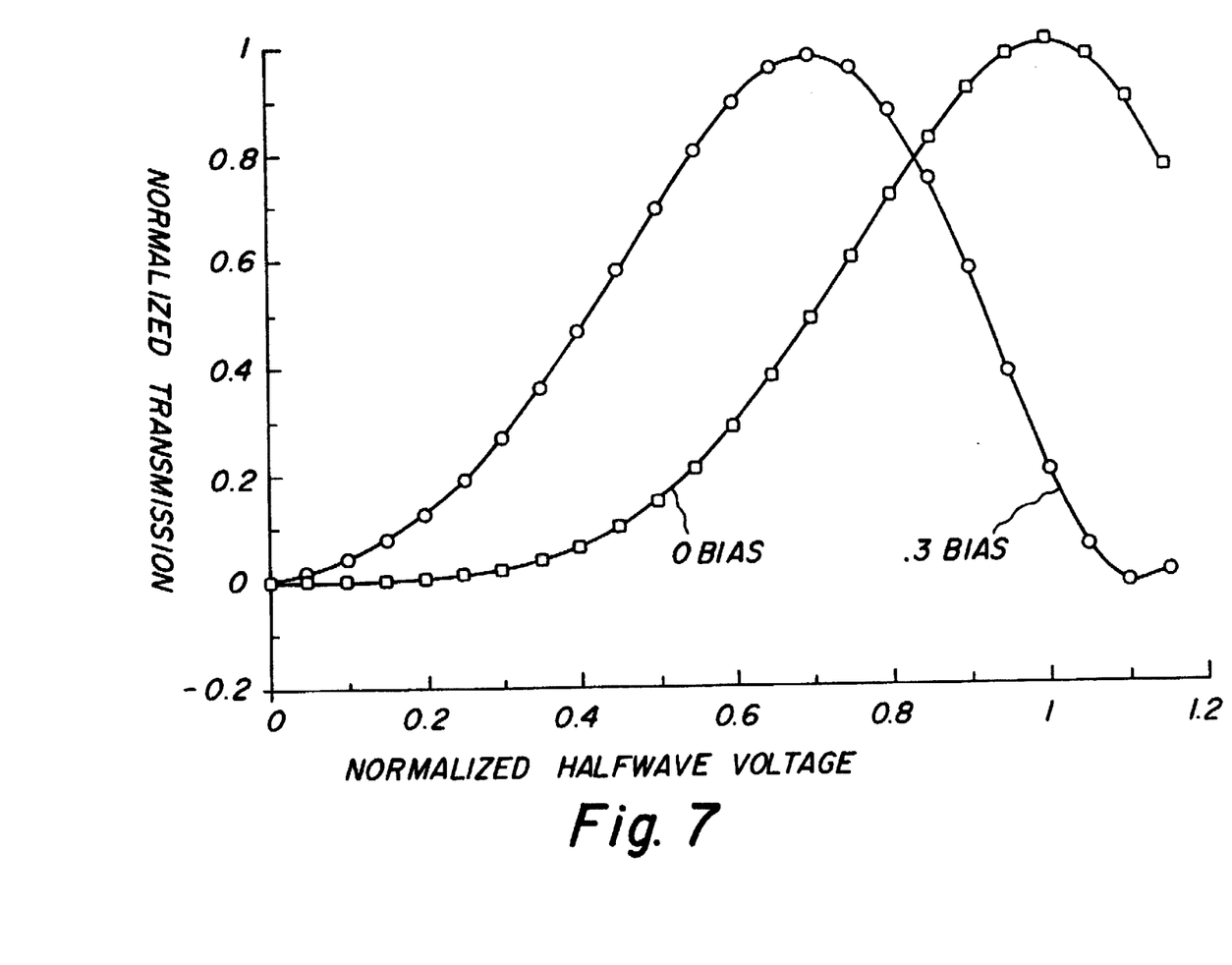
FIG. 7 is a normalized graph of voltage across electrode pairs of an electro-optic modulator, versus light transmitted.

The tandem modulator assembly 40 will provide a more linear response than an unbiased device, and enhances total system performance as shown in FIG. 7. Also, the biased device requires only 70% of the signal voltage required by the unbiased device, to reach full transmission. This reduces the power requirements for the tandem electro-optic modulator.

With the tandem modulator, bias voltage can be adjusted to correct for drift, birefringence, and improperly aligned polarizers. This is accomplished by using a photo detector cell to adjust the bias voltage on the electrode pairs on either the first or second substrate, to minimize the amount of light transmitted through the tandem modulator 40. The photo detector cell detects the amount of light transmitted through the tandem electro-optic modulator 40 and varies the bias voltage applied to second electrode pairs on the second PLZT substrate to achieve minimum amount of light transmitted. In contrast to prior art, this can be accomplished because the minimum transmission is a function of the difference between the bias voltage on the first substrate and bias voltage on the second substrate, and can be tuned to zero by adjusting one or the other. Adjusting the bias voltage of one set of electrodes, provides a method to actively control drift in $T_r$.

The tandem electro-optic modulator will have essentially the same transmitted light as the standard modulator, provided the electrodes are aligned properly. To facilitate this alignment, the second PLZT substrate can be manufactured with substantially narrower electrodes, on the same pitch, as the first PLZT substrate. This construction is possible if only bias voltage is applied to the electrodes on the second PLZT substrate, and the electrodes on the first substrate have both bias voltage and AC signal voltage applied. Electrodes carrying signal voltage must have the narrower gap to have a low signal voltage. Using narrower electrodes on the second substrate, along the same center lines, allows for greater tolerances for alignment of the second substrate electrodes with the first substrate electrodes. This construction will require a higher bias voltage on the second substrate electrodes than on the first substrate electrodes, because the gap between electrodes on the second surface is wider.

Electrode pairs carrying only bias voltage and no signal voltage can also be thinner than electrodes pairs carrying both bias voltage and signal voltage. The reason for this is that current associated with electrodes carrying signal voltage requires thicker electrodes. The thickness of the electrodes is an important consideration from an economic standpoint, since electrodes are often comprised of expensive metals, such as gold. Therefore, reducing the thickness of the electrode can result in significantly reduced manufacturing costs.

The bias voltage applied to the electrodes is a DC voltage. This causes the electro-optic modulators to function as capacitors. Hence, the electro-optic modulators will not draw significant current from the bias voltage supply. Thus, a low current power supply is all that is needed for the bias supplies. On the other hand, the capacitance of these modulators may be as high as several nanofarads. The current required to drive the modulators is proportional to the voltage times the frequency times the capacitance. At frequencies in the 100 kHz region, this requires a significant amount of current since the signal voltage requirement for the biased modulator is only 70% of that of the standard modulator, only 70% of the current is needed for equivalent performance, current required is reduced, which lowers operating cost. Alternatively, a 30% increase in frequency, can be achieved with the same current. Higher frequency gives better productivity, such as increased number of copies per hour.

A bias voltage of 30% of the halfwave voltage was chosen arbitrarily to describe the invention. A bias voltage of 50% or higher, may be desirable for applications where higher frequency and linearity are required. The maximum transmission at the halfwave voltage will decrease with increasing bias voltage, and thus a corresponding increase in intensity from the light source would be required.

There is also a loss in efficiency in PLZT modulators due to hystersis. By reducing the signal voltage, the self-heating is reduced and the modulators will run cooler, which is desirable for a number of reasons.

Figures 8, 9:
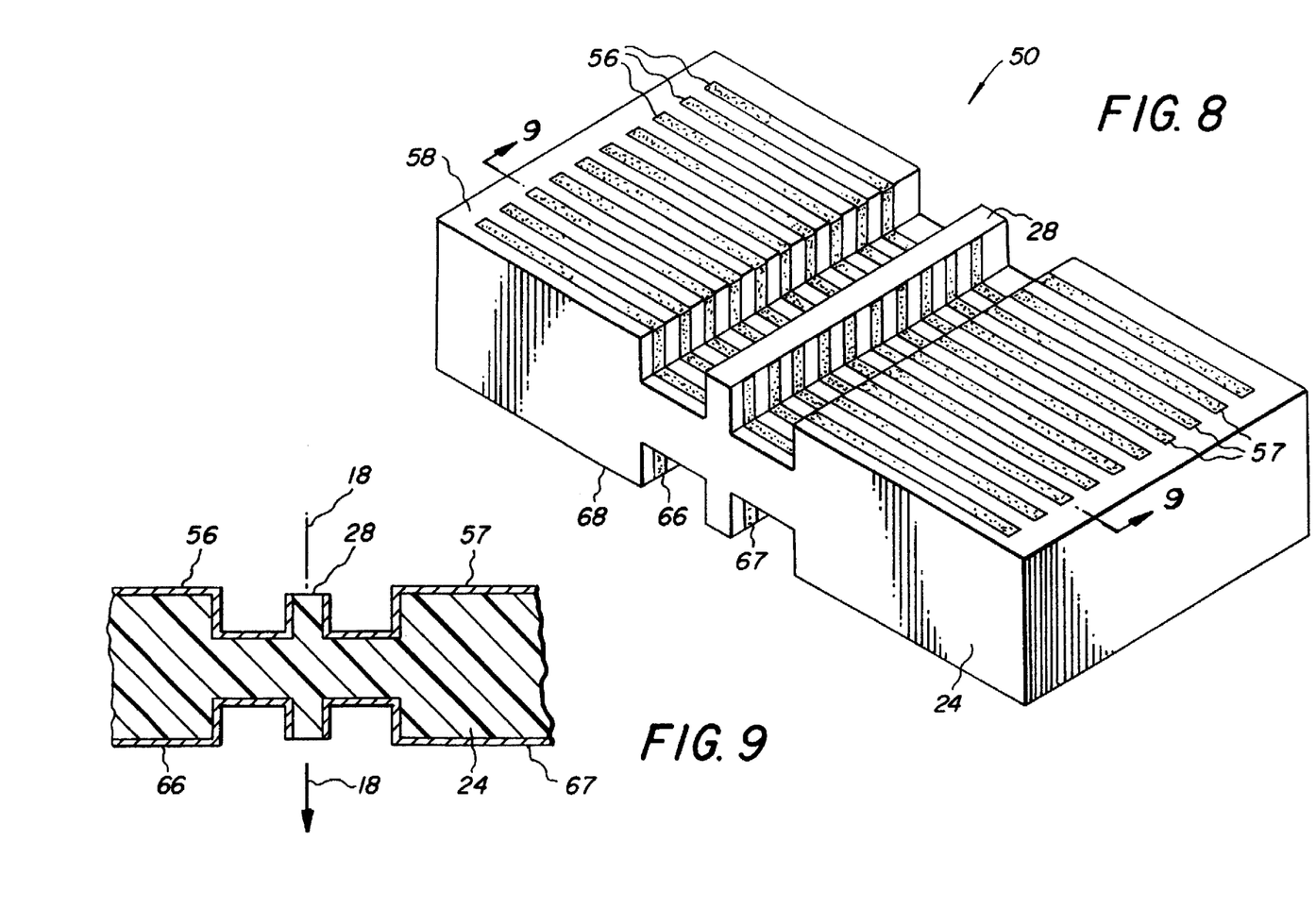
FIG. 8 shows a perspective view of a ridge modulator according to the present invention.
FIG. 9 is a cross-sectional view of the electro-optic modulator shown in FIG. 8 along lines 9—9.

Although this device has been discussed with reference to modulators with surface electrodes, the invention also works well with double-sided ridge electro-optic modulators. Referring to FIGS. 8 and 9, a double-sided electro-optic ridge modulator array 50 is shown. First electrode pairs 56 and 57 on a first surface 58 and second electrode pairs 66 and 67 on a second surface 68 of the ridge modulator are physically aligned. First electrode pairs 56 and 57 establish an electric field across a ridge 28 of PLZT substrate 24. In a similar fashion, second electrode pairs 66 and 67 establish an electric field across an extension of ridge 28 on the second surface 68 of substrate 24. The circuit established by electrodes 66 and 67 are electrically isolated from the circuit established by electrode pairs 56 and 57. A negative bias voltage is applied across electrode pairs 56 and 57 that is approximately 30% of the halfwave voltage. A positive bias voltage of approximately 30% of the halfwave voltage, is applied to electrode pairs 66 and 67.

In operation, the double-sided electro-optic ridge modulator array operates in much the same manner as for an electro-optic modulator with surface electrodes as described above. With no signal voltage applied, the polarization vector of a light beam 18 impinging on ridge 28 will have its polarization vector rotated in a first direction by a bias voltage applied to first electrode pairs 56 and 57. As the light beam passes through ridge 28, the bias voltage across second electrode pairs 66 and 67 rotates the polarization vector of light beam 18 in a second and opposite direction. Thus, the net effect of rotation of the polarization of light beam 18 passing through ridge 28 will be zero.

For example, applying −50 volts bias to electrode pairs on the first surface of the PLZT substrate, and a +50 volts to the electrode pairs on the second surface of the PLZT substrate, at a constant DC voltage, the field vectors oppose each other and no net rotation of the light beam's polarization vector takes place. Applying the signal voltage to the first electrode only, the polarization vector will be rotated with only a slight increase in voltage instead of the 40 volts required for an unbiased device. This improves the linearity of the device and provides a voltage swing of only 115 volts instead of the 165 volts necessary for the same net rotation of the light beam's polarization vector by a single-sided, unbiased device. Dropping the signal voltage also increases the speed of the electro-optic modulator. In addition, less self-heating will occur because the voltage swing is reduced and less energy is required to drive the electro-optic modulator.

Other aspects of this invention applied to electro-optic modulators having surface electrodes, such as use of tandem electro-optic modulators and control feedback loops, are applicable to ridge modulators and modulator arrays.

| PARTS LIST | |
|---|---|
| 1. | 41. PLZT substrates |
| 2. | 42. Glass plate |
| 3. | 43. |
| 4. | 44. |
| 5. | 45. |
| 6. | 46. |
| 7. | 47. |
| 8. | 48. |
| 9. | 49. |
| 10. Electro-optic modulator | 50. Ridge modulator array |
| 11. | 51. |
| 12. First electrodes | 52. |

-continued

PARTS LIST

| | |
|---|---|
| 13. Second electrodes | 53. |
| 14. PLZT substrate | 54. |
| 15. Pixel areas | 55. |
| 16. First polarizer | 56. First electrode pair |
| 17. | 57. First electrode pair |
| 18. Light beam | 58. First surface |
| 19. | 59. |
| 20. Second polarizer | 60. |
| 21. | 61. |
| 22. Ridge modulator | 62. |
| 23. | 63. |
| 24. PLZT substrate | 64. |
| 25. | 65. |
| 26. Electrode | 66. Second electrode pair |
| 27. Electrode | 67. Second electrode pair |
| 28. Ridge | 68. Second surface |
| 29. | 69. |
| 30. Electro-optic modulator assembly | 70. |
| 31. | 71. |
| 32. Adhesive gel | 72. |
| 33. | 73. |
| 34. Glass plate | 74. |
| 35. | 75. |
| 36. Adhesive | 76. |
| 37. | 77. |
| 38. | 78. |
| 39. | 79. |
| 40. Tandem modulator assembly | 80. |

I claim:

1. An electro-optic modulator comprising:

a substrate of electro-optic material with opposed first and second surfaces;

a first electrode pair on the first surface, said pair defining an area therebetween on the first surface such that an electric field is induced in the electro-optic material in the area between the electrode pair when a voltage is applied, wherein a first bias voltage is applied to said first electrode pair, and a second electrode pair on the second surface, said second pair defining an area therebetween on the second surface such that an electric field is induced in the electro-optic material in the area between the electrode pair when a voltage is applied, said electrode pair on the second surface being aligned with the electrode pair on the first surface, wherein said second electrode pair is electrically isolated from said first electrode pair, and a second bias voltage, approximately equal to and of opposite polarity to said first bias voltage, is applied to said second electrode pair.

2. An electro-optic modulator as in claim 1 wherein said first bias voltage is approximately equal to 30% of a half-wave voltage for said electro-optic material.

3. An electro-optic modulator as in claim 1 wherein a signal voltage is applied to said first electrode pair.

4. An electro-optic modulator as in claim 3 wherein said second electrode pair has a width less than a width of said first electrode pair.

5. An electro-optic modulator as in claim 3 wherein said second electrode pair has a thickness less than a thickness of said first electrode pair.

6. An electro-optic modulator as in claim 5 wherein a signal voltage is applied to said first electrode pair.

7. An electro-optic modulator as in claim 1 wherein a first polarizer, oriented at approximately 45° to a first electrode pair, is mounted on said first surface, a second polarizer, oriented approximately 90° from the orientation of said first polarizer, is mounted on said second surface.

8. An electro-optic modulator comprising:

a substrate of electro-optic material with opposed first and second surfaces;

a first plurality of electrode pairs on the first surface, each of said pairs defining an area therebetween on the first surface such that an electric field is induced in the electro-optic material in the area between an electrode pair to which a voltage is applied, said electrode pairs being spaced apart on the first surface one from another by a gap to minimize electrical cross talk, wherein a first bias voltage is applied to said first plurality of electrode pairs; and a second plurality of electrode pairs on the second surface, each of said pairs defining an area therebetween on the second surface such that an electric field is induced in the electro-optic material in the area between an electrode pair to which a voltage is applied, said electrode pairs on the second surface being aligned with the electrode pairs on the first surface, wherein said second plurality of electrode pairs is electrically isolated from said first plurality of electrode pairs, and a second bias voltage approximately equal to and of opposite polarity to said first bias voltage is applied to said second plurality of electrode pairs.

9. An electro-optic modulator as in claim 8 wherein said first bias voltage is approximately equal to 30% of a half-wave voltage for said electro-optic material.

10. An electro-optic modulator as in claim 8 wherein a signal voltage is applied to each pair of said first plurality of electrode pairs.

11. An electro-optic modulator as in claim 10 wherein each electrode of said second plurality electrode pairs has a width less than a width of each electrode of said first plurality of electrode pairs.

12. An electro-optic modulator as in claim 10 wherein each electrode of said second plurality of electrode pairs has a thickness less than a thickness of each electrode of said first plurality of electrode pairs.

13. An electro-optic modulator as in claim 8 wherein a first polarizer, oriented at approximately 45° to a first electrode pair, is mounted on said first surface, a second polarizer, oriented approximately 90° from the orientation of said first polarizer, is mounted on said second surface.

14. An electro-optic modulator comprising:

a first substrate of electro-optic material with opposed first and second surfaces;

a first electrode pair on the first surface, said first pair defining an area therebetween on the first surface, such that an electric field is induced in the electro-optic material in the area between the electrode pair when a voltage is applied;

a second electrode pair on the second surface, said second pair defining an area therebetween on the second surface, such that an electric field is induced in the electro-optic material in the area between the electrode pair when a voltage is applied, said electrode on the second surface being aligned with the electrode pair on the first surface and in series with said first electrode pair;

a second substrate of electro-optic material with opposed third and fourth surfaces;

a third electrode pair on said third surface, said third pair defining an area therebetween on the third surface, such that an electric field is induced in the electro-optic material in the area between the electrode pair when a voltage is applied;

a fourth electrode pair on said fourth surface, said fourth electrode pair defining an area therebetween on the fourth surface such that an electric field is induced in the electro-optic material in an area between the electrode pair when a voltage is applied, wherein said electrode pair on the fourth surface is aligned with the electrode pair on the third surface and electrically in series with the third electrode pair;

a first bias voltage applied to said first and second electrode pairs on said first substrate; and a second bias voltage applied to said third and fourth electrode pair on said second substrate, wherein said second bias voltage is of opposite polarity from said first bias voltage and approximately equal in magnitude.

15. An electro-optic modulator as in claim 14, wherein said first and second electrode pairs are in series and said third and fourth electrode pairs are in series.

16. An electro-optic modulator as in claim 14, wherein a glass spacer is interposed between said first substrate and said second substrate.

17. An electro-optic modulator as in claim 14, wherein a first polarizer is oriented at 45° to said electrode pair on said first substrate and attached to the first surface of said first substrate, and a second polarizer oriented at 90° to said first polarizer, is attached to an outer surface of said second substrate.

18. An electro-optic modulator as in claim 14, wherein said electro-optic modulator is a ridge modulator.

19. An electro-optic modulator as in claim 14, wherein said modulator is a surface electrode electro-optic modulator.

20. An electro-optic modulator as in claim 14, wherein a photo detector measures light transmitted through the first and second substrate and adjusts the first bias voltage to minimize light transmitted in the absence of a signal voltage.

* * * * *